(12) United States Patent
Tichenor

(10) Patent No.: US 6,463,449 B2
(45) Date of Patent: Oct. 8, 2002

(54) SYSTEM FOR CREATING NON-ALGORITHMIC RANDOM NUMBERS AND PUBLISHING THE NUMBERS ON THE INTERNET

(76) Inventor: Clyde L. Tichenor, 6470 LaCumbre Rd., Somis, CA (US) 93066

( * ) Notice: Subject to any disclaimer, the term of this patent is extended or adjusted under 35 U.S.C. 154(b) by 0 days.

(21) Appl. No.: 09/845,991

(22) Filed: Apr. 30, 2001

(65) Prior Publication Data

US 2001/0032224 A1 Oct. 18, 2001

Related U.S. Application Data

(60) Provisional application No. 60/200,903, filed on May 1, 2000.

(51) Int. Cl.[7] .............................. G06F 7/58; G06J 1/00
(52) U.S. Cl. ........................................... 708/255; 708/3
(58) Field of Search .............................. 708/3, 250–256, 708/801

(56) References Cited

U.S. PATENT DOCUMENTS

| | | | | | |
|---|---|---|---|---|---|
| 5,307,410 | A | * | 4/1994 | Bennett | ........................ 380/21 |
| 5,764,765 | A | * | 6/1998 | Phoenix et al. | ................ 380/21 |
| 6,195,669 | B1 | * | 2/2001 | Onodera et al. | ................ 708/3 |
| 6,249,009 | B1 | * | 6/2001 | Kim et al. | ................... 250/580 |

* cited by examiner

*Primary Examiner*—Tan V. Mai
(74) *Attorney, Agent, or Firm*—Albert O. Cota

(57) ABSTRACT

A system for creating non-algorithmic, digital random numbers (20) and publishing the numbers (20) at both a high and low rate of speed on a secured Internet site (34). The numbers (20) which are used for encryption and are stored as a sequence of numbers that can incorporate a predetermined time delay, and are subsequently published on the Internet site.

4 Claims, 2 Drawing Sheets

SYSTEM FOR CREATING NON-ALGORITHMIC RANDOM NUMBERS AND PUBLISHING THE NUMBERS ON THE INTERNET

This Application claims benefit of Provisional Application Ser. No. 60/200,903 Filed May 1, 2000.

TECHNICAL FIELD

The invention pertains to the general field of cipher encryption and more particularly to a structure and process for generating a natural, non-algorithmic sequence of random numbers for Presentation on an Internet subscription site.

BACKGROUND ART

Modern day cipher encryption is commonly based on computer-generated random numbers. A problem resulting from the encryption is that to create such numbers a first computer must use discrete algorithms.

To decipher encrypted messages, a second computer with sufficient speed and memory, systematically experiment with various algorithms related to a message requiring encryption. Test cases that were predicted to take 10 Years of computer time have been solved in as little as 24 hours by using only two personal computers.

Therefore, the encryption of messages using non-computer generated random numbers is highly desirable. Such a system is presented in this present application. A second purpose of this present application is to create a means that will publish, via the Internet a commercial and Public commodity value on such an encryption aid.

A search of the prior art did not disclose any patents that read on the claims of the instant invention.

DISCLOSURE OF THE INVENTION

The occurrence of random events is a natural phenomenon in the universe. The Utilization of at least one such event is the basis for operating the present invention. For example, a first random event method utilizes a large quantity of mixed ball bearings having random diameters. The balls pass through a diameter measuring gate that actuates an electrified potentiometer or optic sensor, which then produces a voltage proportional to each ball's diameter. The produced voltage is then fed into an analog-to-digital converter (ADO), which sequentially produces random digital numbers within the permutation of the quantity of the balls.

A second method utilizes a radio active source which affects a Geiger or scintillation counter. The counter receives the random radioactive particles where each particle creates a discharge path to a capacitor that is being charged at some rate through a series resistor. The average time interval between radioactive event pulses would therefore be proportional to the capacitor charge voltage. By using an ADC a sequence of random numbers are created. Alternatively, the Geiger or scintillation pulses may be applied to an Events-per-Unit-Time (EPUT) meter, which produces a digital numerical interval count.

A third method utilizes the reflective and refractive properties of a fluid column having bubbles from air jets traveling upward through the fluid. The bubbles modulate a light source passing through the fluid, or reflected off of its surface, onto photo-sensors, such as phototransistors or photodiodes. Again, by means of an ADC, random digital numbers are produced. Further methods can utilize white noise or thermal noises in resistors and various other such means for the basis of producing random digital numbers.

Once a series of numbers have been generated, it is desirable to both sequentially memorize each number and to allow its continuous electronic presentation, or a visual printed list of the same. If such a list, or its submission to an Internet-based interrogating computer is created, a viable commercial Product is provided for those entities willing to pay for site access and who need secure encryption. While each entity using such site access may receive a part of the list of numbers, no advantage is gained unless two or more interrogating entities agree on exactly which numbers or the exact time, they will be mutually using the intercepted numbers for encryption and decryption. By this method, the two participating entities can achieve a mutually known random number sequence for their encryption use. No additional data needs to be transmitted from one entity to the other beforehand. And only the knowledgeable entities can utilize the sequence of numbers for encryption and decryption.

Such knowledge specifically is not transmitted on the Internet site, but available to them by other means of foreknowledge. They can also repeat the number acquisition again at a later time which is only known by the participating entities, and use the total multiple random number groups combined in an encryption-proof algorithm The number groups may also be mixed with algorithmically-derived message for misleading encryption paths and used in various coding strategies.

Normally, the random numbers are transmitted at a high rate of speed for computer use only, wherein by removing every $10^{th}$, $100^{th}$, or the $n^{th}$ number, these selected extracted numbers can provide a second, slower visual random number presentation for a different type of user. Software can provide a choice of the high-speed mode or the slow speed presentation.

For those needing more fail-safe, positive encryption keys, the created random numbers may be confidentially stored, for example over 24 hours, and then transmitted over the Internet. This time interval allows transmittal of the identity of a forthcoming key group of numbers (possible 10). since these numbers may be known as generated, they can be selected for later client use after the 24-hour period. Having such a selected group of numbers beforehand allows a client's computer to withhold recording and to wait for the key numbers and then record the desired number series that follows. By mutual arrangement, the participating clients can also count, say 50 (or n) more numbers, and then use those that follow for encryption. This positive lock service of the high speed and delayed numbers could be made available at a premium price, In view of the above disclosure it is the purpose of the invention to produce an encryption and decryption process for:

using random, physically-created phenomena for a random digital number sequence without algorithms, publishing the number sequence at both a high and low of speed on a secured Internet site requiring prepayment accesses, storing the numbers in a sequence and after a predetermined time delay publishing the number sequence on the Internet site, storing pre-published high sequence rate, key number groups prior to their being published on the Internet site. Key number groups that allow high-speed computer latch recording for utilizing the following random numbers in encryption, and simultaneously providing both a computer readable and a low presentation set of visually-available numbers derived from the high-speed random numbers.

These and other objects and advantages of the present invention will become apparent from the subsequent detailed description of the preferred embodiment and the appended claims taken in conjunction with the accompanying drawings.

BEST MODE FOR CARRYING OUT THE INVENTION

The best mode for carrying out the invention is presented in terms of a preferred embodiment, as shown in FIGS. 1–4, for a System for creating non-algorithmic random numbers and publishing the numbers on the Internet.

Figure 1:
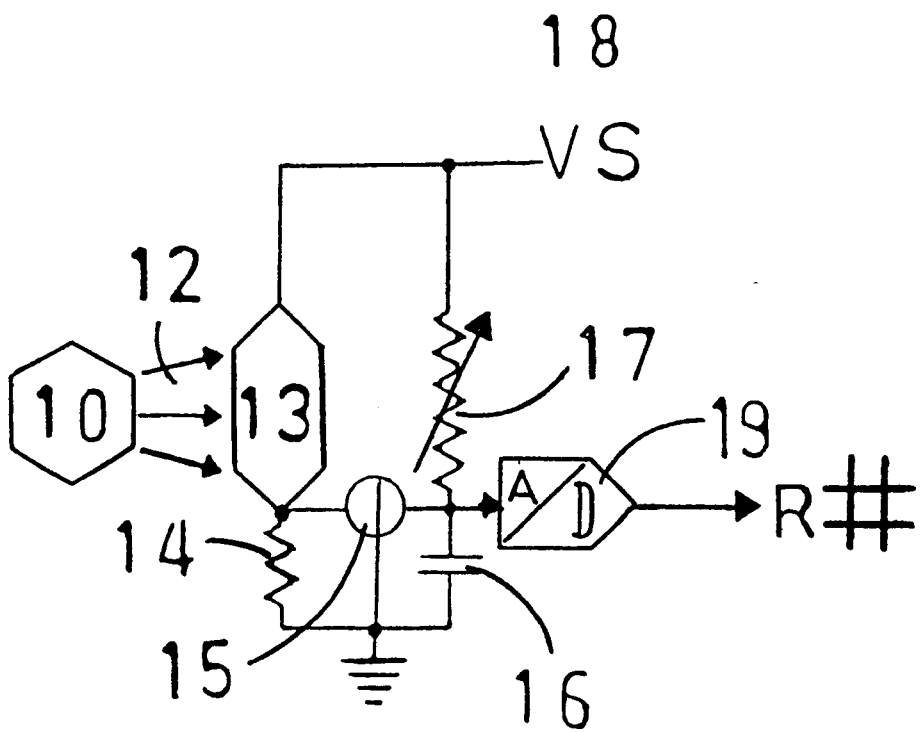
FIG. 1 is a combined block and schematic diagram of a random radioactive source which generates random numbers which are applied to a scintillator and an analog-to-digital converter to produce digital numbers.

FIG. 1 depicts a natural random number generator comprising a radioactive source 10 emitting radio-active rays 12 to a Geiger counter 13. The counter 13 when ionized into conduction, creates a voltage spike across resistor 14 that is passed via an IC coupler 15 to a capacitor 16 which is being charged on a timed basis via rate adjustable resistor 17 from voltage source 18. The analog-to-digital converter (ADC) 19 constantly monitors the capacitor voltage and converts the voltage to random digital numbers 20.

Figure 2:
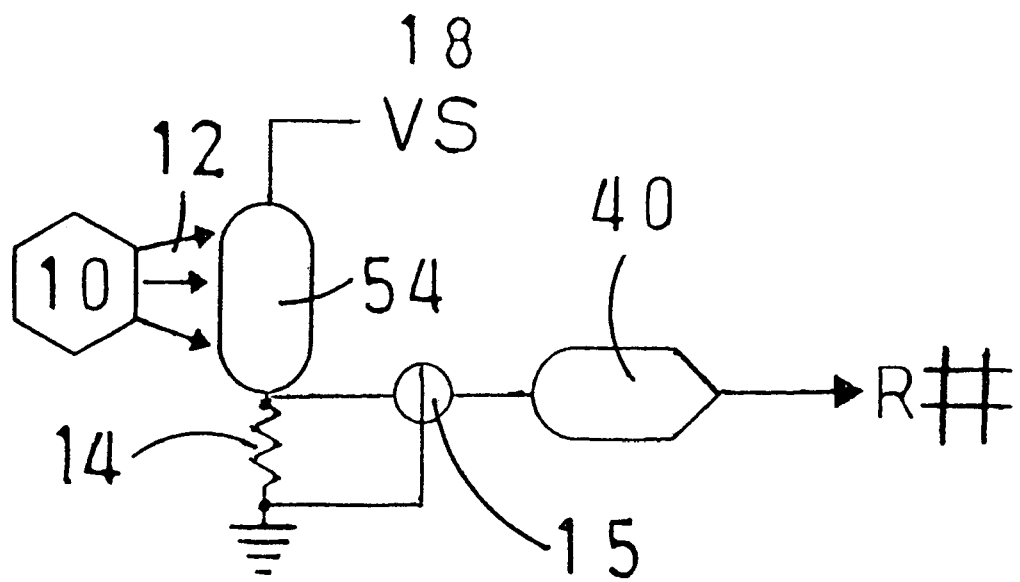
FIG. 2 is a combined block and schematic diagram of a random radioactive source which generates random numbers which are applied to a Geiger counter and an EFUT meter to produce digital numbers.

FIG. 2 depicts a natural random number generator comprising a radioactive source 10 emitting radio-active rays 12 to a Scintillator 54. The scintillator 54, when ionized into conduction, creates a voltage charge across resistor 14 that is passed via an IC coupler 15 to an Events per Unit Time (EPUT) meter 40 which creates random digital numbers 20 as a function of the intervals between the ionization events in the scintillator 54.

Figure 3:
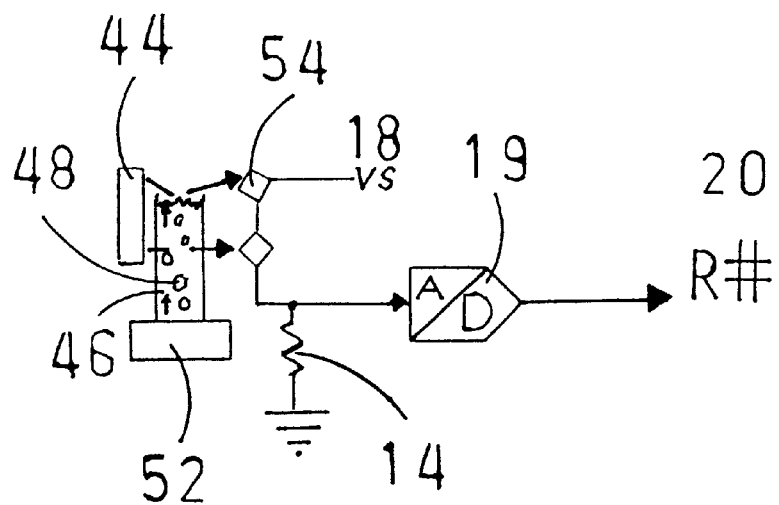
FIG. 3 is a combined block and schematic diagram of a random source using a bubbling fluid to generate random numbers which are applied to photosensors and an analog-to-digital converter to produce digital numbers.

FIG. 3 shows a fluid column 46 contained in a fluid tank 50 enclosing an air pump 52 which forces air bubbles 48 into the fluid column 46. A light source 44 is positioned opposite at least one photosensor 54, such as phototransistors or photodiodes, which are connected across a voltage source 18 and a resistor 14. This circuit allows an analog/digital converter 19 to be modulated and produce random numbers 20. The bubbles randomly modulate the fluid refraction and reflection properties to the photosensors shown in FIG. 3.

Figure 4:
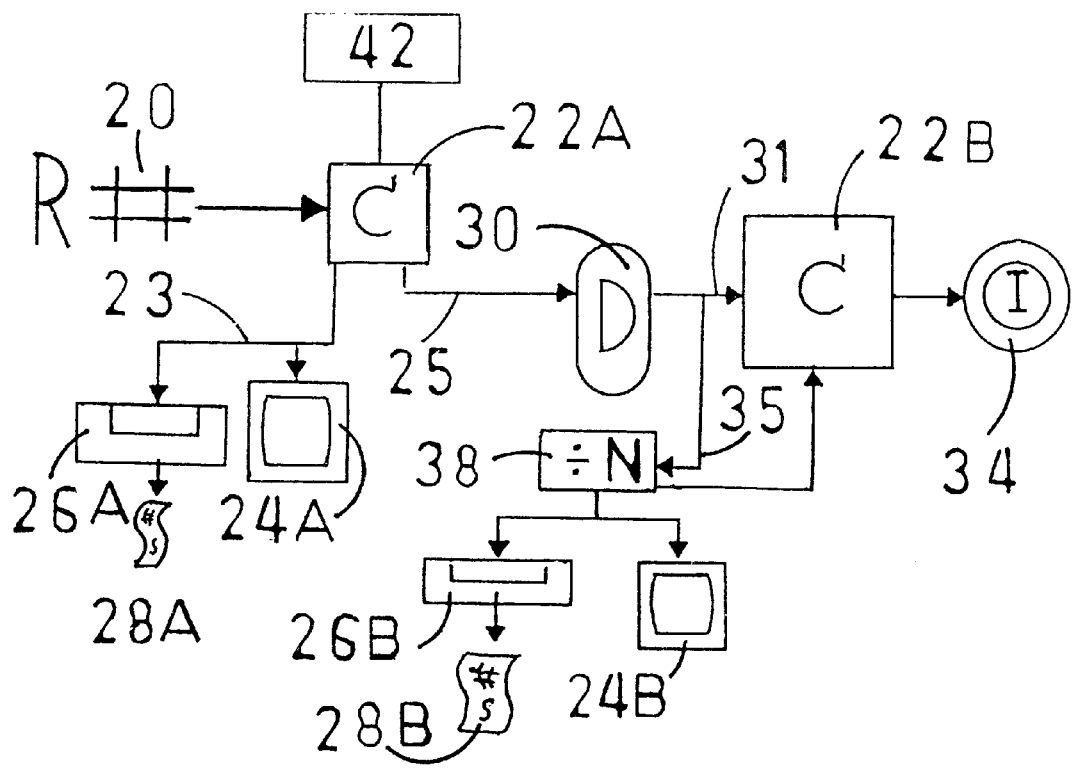
FIG. 4 is a block diagram of a system for using naturally-created random numbers which are applied to a computer for:
monitor screen presentation and printout,
to store such numbers for a chosen time delay before again providing the numbers via monitor and printer, and
to produce the numbers via a modem to the Internet where they can be available on a subscription basis and presented for use as a visual and printed record from the Internet.

In FIG. 4 a source of digital random numbers 20 are applied to a computer 22A which has two outputs and that incorporates a precision WWN monitored clock 42. The first computer output 23 is connected to a first monitor 24A and a first printer 26A which prints a list 28A of the currently produced digital random numbers 20.

The second computer output 25 can be directed to a time delay/storage unit 30, which can store sequential numbers for a desired period of X time. The delay/storage unit 30 has two outputs: the first output 31 is connected to a full sequence recording computer 22B having a modem 36 that communicates with a secure Internet site 34; the second output 35 is connected to a divide-by-n counter 38 which transfers every chosen $n^{th}$ number to the delay monitor 24B and a second printer 26B which prints for recordation the delayed slow random number list 288. This list is also transferred to the Internet site 34 via the computer 22B and the modem 36.

While the invention has been described in complete detail and pictorially shown in the accompanying drawings it is not to be limited to such details, since many changes and modifications may be made to the invention without departing from the spirit and the scope thereof. Hence, it is described to cover any and all modifications and forms which may come within the language and scope of the claims.

What is claimed is:

1. A system for creating a set of non-algorithmic random digital numbers comprising:
    a) means for utilizing a natural, random physical phenomena as a source for creating said set of random digital numbers, wherein said physical phenomena is derived from optical changes of light sent to a sensor, wherein the optical changes are caused by reflective, and refractive changes of a refractive index of a fluid, and
    b) means for retrieving said set of random digital numbers for later use in cipher encryption and decryption.

2. The system as specified in claim 1 wherein the change of the refractive index results from bubbles rising in a fluid tank.

3. The system as specified in claim 2 further comprising a centrifugal pump which pumps water into the water container to accelerate the production and speed of the bubbles.

4. A system for creating a set of non-algorithmic random digital numbers comprising:
    a) a natural, random physical phenomena for creating said set of random digital numbers, wherein said physical phenomena is derived from optical changes of light sent to a sensor, wherein the optical changes are caused by reflective, and refractive changes of a refractive index of a fluid, and
    b) a means for storing and retrieving said set of random digital numbers, wherein said numbers are sequentially stored in said means for a predetermined time period before being released to a secured Internet site from where the numbers are accessed.

* * * * *